United States Patent
Sebő

(10) Patent No.: US 9,936,678 B2
(45) Date of Patent: *Apr. 10, 2018

(54) PRESSURE DISTRIBUTION ELEMENT HOLDING A RING FOR CHEST HARNESSES

(71) Applicant: Julius-K9, LLC, Riverview, FL (US)

(72) Inventor: Gyula Sebő, Szigetszentmiklós (HU)

(73) Assignee: JULIUS-K9 LLC, Tampa, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/594,549

(22) Filed: May 12, 2017

(65) Prior Publication Data
US 2017/0311572 A1 Nov. 2, 2017

Related U.S. Application Data

(63) Continuation of application No. 14/956,347, filed on Dec. 1, 2015, now Pat. No. 9,655,344.

(51) Int. Cl.
*A01K 15/02* (2006.01)
*A01K 27/00* (2006.01)

(52) U.S. Cl.
CPC ............ *A01K 27/002* (2013.01); *A01K 15/02* (2013.01); *A01K 2227/10* (2013.01)

(58) Field of Classification Search
CPC .. A01K 27/002; A01K 1/0263; A01K 27/003; A01K 27/005; A01K 15/02
USPC ....... 119/863, 792, 907, 856, 850, 858, 865; D30/152
See application file for complete search history.

(56) References Cited

U.S. PATENT DOCUMENTS

| | | | | |
|---|---|---|---|---|
| 4,559,906 A | * | 12/1985 | Smith | A01K 1/0263 119/728 |
| 4,676,198 A | * | 6/1987 | Murray | A01K 1/0263 119/771 |
| D313,677 S | * | 1/1991 | Hammon | D30/152 |
| 5,184,762 A | * | 2/1993 | Nevitt | A01K 27/002 119/858 |
| D511,596 S | * | 11/2005 | Mugford | D30/152 |
| 2006/0102102 A1 | * | 5/2006 | Bennett | A01K 27/002 119/792 |
| 2007/0266960 A1 | * | 11/2007 | Mugford | A01K 27/002 119/792 |
| 2010/0122667 A1 | * | 5/2010 | Horgan | A01K 27/002 119/792 |
| 2013/0327282 A1 | * | 12/2013 | Sebo | A01K 13/006 119/850 |

(Continued)

FOREIGN PATENT DOCUMENTS

| | | | | |
|---|---|---|---|---|
| EP | 2910117 A1 | * | 8/2015 | A01K 27/002 |
| GB | 2481430 A | * | 12/2011 | A01K 27/002 |

*Primary Examiner* — Yvonne R Abbott-Lewis
(74) *Attorney, Agent, or Firm* — Hershkovitz & Associates, PLLC; Abe Hershkovitz (57) ABSTRACT

A pressure distribution element holding a ring, attachable to the horizontal chest strap of a chest harness which is closable-openable by a hook-and-loop fastener, by connecting the chest strap loop section and the chest strap hook section comprising a chest strap connecting portion, and a vertical connecting element connecting the horizontal chest strap of the dog harness to the belly strap, forming a loop around the belly strap by folding back on itself, comprising at least a loop section, continued in a lower loop portion resting on the belly strap of the dog harness.

20 Claims, 5 Drawing Sheets

(56) References Cited

U.S. PATENT DOCUMENTS

| | | | |
|---|---|---|---|
| 2014/0202398 A1* | 7/2014 | Woodward | A01K 27/002 119/864 |
| 2014/0245970 A1* | 9/2014 | Wilson | A01K 27/002 119/864 |
| 2015/0007778 A1* | 1/2015 | Yamin | A01K 27/002 119/792 |
| 2016/0183496 A1* | 6/2016 | Wilson | A01K 27/003 119/719 |

* cited by examiner

PRESSURE DISTRIBUTION ELEMENT HOLDING A RING FOR CHEST HARNESSES

CROSS-REFERENCE TO RELATED APPLICATION

This is a continuation of U.S. application Ser. No. 14/956,347 filed Dec. 1, 2015, pending, which is incorporated herein in its entirety by specific reference thereto.

FIELD OF THE INVENTION

The invention relates to a chest harness with an elastic chest strap, developed for four-legged mammals.

BACKGROUND OF THE INVENTION

As is known, dogs are born for action. A lot of equipment is needed in the shared everyday life of man and dog, in their shared sports activities, or for the training and deployment of service dogs. Within this, the function of dog harnesses is to lead the dog on a leash, hold it back, lift it, assist it in traffic, to pull loads, or do sports involving dogs, by means of straps running across the chest, around the neck, under the belly and along the back of the dog, and connected to each other. Numerous solutions are known from practice, where the load is distributed on the neck and chest of the dog. One of these solutions is disclosed in U.S. Pat. No. 5,325,819, which discloses a collar having cords attached thereto which pass between the forelegs of the dog.

Another prior art reference, Utility model No. DE 203 04 940 U1, also discloses a collar connected to a belly strap by means of a connecting element. Other types of dog harnesses, such as chest harnesses, try to relieve the neck of the dog, and therefore the straps run further away from it, only across the chest, under the belly and along the back of the dog. One such harness is disclosed in DE 20219 554 U1, G 90 17 247.7 Deutschland, DE 203 04 940 U1. A horizontal (chest harness) chest strap allows the dog harness to be put on the dog in the simplest way, without pulling it over the legs. This type of dog harness is pulled over the head of the dog like a collar, and the ring suitable for connecting a leash is located on the withers (back) of the dog. Chest harnesses with a chest strap leave the neck of the dog completely free, not surrounded by belts. The two most important straps of a dog harness, the chest strap and the belly strap, are connected to each other behind the forelegs of the dog, on the trunk of the dog. The chest strap runs strictly at the height of the chest bone of the dog or slightly above it, well below the height of the throat, not choking the dog by any means. The belly strap can be a continuation of a back strap resting on the back of the dog, perpendicular to the spine, and it is this back strap to which a leash ring is attached.

The horizontally running chest strap and the back strap of dog harnesses are connected, most preferably on both sides, by a connecting element that is a curved element formed by a strap/leather belt or a saddle shaped blanketing part. The connecting element connects the chest strap and the back strap in a fixed manner. Such equipment is disclosed in UK 389,276. Generally speaking, the adjustability of the chest strap, running horizontally at the height of the chest bone of the dog, and presently made of a woven strap, was implemented only at the beginning of the 1990s. The openable horizontal chest straps and the additional devices attachable thereto appeared around the turn of the millennium.

The best chest harness comprises straps and a saddle part having an adjustable and openable chest strap, and was introduced into regular use first by the Austrian police forces. Later, it became used all over the world, and known as the K9-Powerharness, as disclosed in DE 302009060989. This was the first implementation of a chest strap openable by a hook-and-loop fastener that could be adjusted to the chest size of the dog, developed to rest flat on the chest of the dog in a continuous manner. This way, the distance of the connection point of the chest strap and the belly strap from the forelegs of the dog can be adjusted according to the build of the dog without the need to attach various buckles or slide adjusters to the chest strap. The resting surface of the chest strap is increased and its pressure distribution capability improved. The buckle of the belly strap could be placed at such a distance from the elbow of the dog that the dog would no longer be hurt or prevented from free movement or from making the maximum effort. It is important to note that the prior art before the K9-Powerharnesses included dog and horse harnesses made primarily of leather or narrow straps, equipped with many buckles and metal accessories that were very difficult to adjust, comprising disadvantageously narrow belts from the point of view of pressure distribution, and in some cases with extra padding on the chest strap part. The padding resulted in extra weight and limited adjustability.

A further advantage of the K9-Powerharnesses is that, at least on one side, the chest strap is connected to the belly strap in the line of the forelegs of the dog in such a way that it is interrupted by a fastener/loop adjuster threaded through it. The fastener/loop adjuster is suitable for threading wide, flat straps through it, that is, threading the chest strap through it and closing it on itself on the side towards the chest of the dog. The closing of the chest strap of the K9-Powerharness on itself on the side towards the chest of the dog means that, the more effort that is made by the dog to go forward, the more the components of the hook-and-loop fastener of the chest strap close on each other. Therefore, the chest strap can withstand hundreds of kg of load in a dimensionally stable manner. The closing of the chest strap would not require additional buckles that would increase the weight or push against the chest of the dog. This allows a horizontal chest strap design that is proportionally significantly wider and thus has a higher pressure distribution capacity, developed to rest flat on the chest of the dog in a continuous manner.

The buckles and slide adjusters ensuring the adjustability of the chest straps found in the prior art prevents the chest strap from resting flat on the chest of the dog. A problem remaining from the prior art to be solved was vertical connection to the belly strap between the two forelegs of the dog. The chest strap of the K9-Powerharness, openable along its whole length by a hook-and-loop fastener, allowed for the first time the attachment of additional devices to prevent the chest strap from sliding towards the neck of the dog, and to reduce the pressure load on the chest. These devices provide maximum comfort and safety for the dog generally through the releasable vertical connection of the chest strap and the belly strap. The K9-Powerharnesses, due to their extremely diverse applicability (service, assault and rescue dogs, therapy and guide dogs, ordinary dog owners), and the fact of their geographically widespread use, forms a completely separate category within the chest harnesses. Their gaining ground in the market transformed the dog equipment culture worldwide, and led to numerous patents related to this development.

In the prior art, the first pressure distribution element attachable to the chest strap of a chest harness in a releasable manner, connecting the chest strap and the belly strap, was the so called "Y" strap, presented in the following document: (http:web.archive.org/web/20031010141013/www.hundesportartikel.at/military/geschirre.html<http://www.hundesportartikel.at/military/geschirre.html>)

For the attachment of the "Y" strap, the chest strap needs to be fully openable, as the "Y" strap is attached by pulling it on. One example of this type of dog harness is shown in another reference, No. DE3020090609896. The chest strap of the chest harness closes on itself by a hook-and-loop fastener in a releasable manner. Two loop portions formed on the stalk portion of the "Y" pressure distributor, as chest strap connecting portions, allow the attachment of the "Y" pressure distributor to the chest strap by pulling it on. After attaching it to the chest strap by pulling it on, the "Y" strap is connected to the chest strap by the two loop portions. The components of the hook-and-loop fastener of the chest strap close on each other on the surfaces not covered by the loop portions, and fix the length of the chest strap.

A disadvantage of this device is that both loop portions of the "Y" strap can be damaged by the hook-and-loop fastener of the chest strap when they are pulled on the chest strap, and can be subjected to continuous, increased stress during normal use. There is no adhesion between the chest strap and the loop portions along the full width of the two loop portions, and therefore, they can be displaced horizontally. Furthermore, the horizontal displacement of the "Y" strap is incidental, as there is no other fixing element on the loop portions either. This device, attempting to relieve the chest of the dog, does not directly allow or facilitate the training of dogs on a leash. There is no advantageous location on the "Y" strap for the attachment of a ring suitable for connecting a leash, as the loop portions can be displaced during use, and their surface can be damaged by the hook-and-loop fastener of the chest strap.

This dog harness model has expanded far beyond its original scope of application, which was the field of working and service dogs. A result of its widespread use among civilian or amateur dog owners therefore is that, due to its excellent pressure distribution, for dogs wearing this harness and feeling stronger, pulling on the leash is a positive experience. The training problem of dogs wearing the harness has become a global training task. Their pulling power has been increased by the use of various additional pressure distribution devices attachable to the chest strap which have a beneficial effect on the joints and make even the forces acting in a car accident tolerable for the dog, if it is secured properly in the car.

Thus, it is understandable that, in the case of a chest harness, holding back aggressive, fearful, scared dogs, for example in street traffic, or controlling them on a leash in any stress situation, causes a problem for many dog owners.

It is also recognized that any equipment or dog harness that pulls the head of the dog by means of belts and a leash ring attached to it (the development called HALTI), or the neck of the dog by means of belts forming a harness, as shown in U.S. Pat. No. 7,370,608 B1, when controlled on a leash, can pose a threat to the vertebrae in the neck of the dog. There is no doubt, however, that the aim of the latter US patent was a dog "restraining" device, including a ring attached to the chest strap suitable for connecting a leash. This device comprises a saddle part and straps attached thereto, as shown in the figures, puts a load on the neck of the dog through the ring attached to the upper chest strap. Furthermore, to facilitate dog training, the leash ring can move completely freely on the upper chest strap (neck portion), and the movement of the leash ring is limited only by the connecting elements. The leash ring is not padded on the side towards the neck of the dog.

During training with this device, the neck of the dog and the whole throat area comes into direct contact with the moving ring. All of the listed properties are not only disadvantageous from the point of view of training, but also detrimental for the dog. A further disadvantage of the device is that, when the ring attached to the chest strap is pulled by a leash indispensable for training, the chest strap is pulled up to the neck of the dog, as the chest strap and the belly strap are not connected to each other vertically between the two forelegs of the dog. The chest strap of this prior art dog harness, unlike that of the K9-Powerharnesses, is not adjustable by a hook-and-loop fastener and not openable at all, and therefore, does not provide a solution for the most common chest harness problems. Furthermore, the ring attached to the upper chest strap is not removable. During everyday use, it poses a risk of getting caught up or stuck. Therefore, this prior art dog harness is not suitable for everyday use.

A ring attached to the horizontal chest strap at its center, interrupting the continuity thereof, is shown in U.S. Pat. Nos. 7,886,699 and 8,869,750. These US patents disclose training apparatuses where rings facilitating the leading of the dog on a leash are attached in an unreleasable manner to the chest strap and at the connection points of the chest strap, the belly strap and the back strap. One ring is attached at the center of the chest strap, with the chest strap threaded through it from both directions and fixed by sewing. A slide adjuster suitable for adjusting the length of the chest strap section is fixed to the chest strap on both sides. On this prior art dog harness, each ring suitable for connecting a leash interrupts the continuity of the straps, having a connecting, load-bearing role between the straps.

The forces acting during leading on a leash in this prior art harness, unlike in the case of the K9-Powerharnesses, act directly on the chest strap of the given dog harness and on the chest strap ring attached thereto. The greater the force, the and momentum of the dog, the higher the load on the chest strap ring.

A disadvantage of such prior art harnesses is that, by such higher load, the rings subject a constant load on the dog, irrespective of whether the leash is connected to the given ring or not.

A further disadvantage of such prior art harnesses is that the rings attached to the chest strap and on the side of the dog harness are not padded on the side towards the dog. The leash connector connected to the ring, and the ring itself, come into direct contact with the body of the dog, and therefore, the dog is subjected to constant friction. The rings are not flattened to make constant contact with the body of the dog impossible. Furthermore, the chest strap is not connected vertically to the belly strap. Accordingly, during work, the chest strap is detrimentally pulled up to the neck of the dog by the leash connected to the chest strap. By threading the chest strap through the slide adjusters, loops are created that prevent it from preferably resting flat on the chest of the dog, whereby the pressure distribution capacity of the chest strap of the dog harness is reduced. A disadvantage in such prior art devices is that the dog harness does not have a ring suitable for connecting a leash on the back strap. Another disadvantage is that, by threading the chest strap through the ring, the diameter of the ring limits the width of the chest strap.

A further disadvantage of such prior art harnesses is that the chest strap sections attached to the ring from both sides limit the connectability of the leash. The chest strap is not operable. The rings attached to the sides and to the chest strap in these prior art devices, originally to facilitate training, are not removable from the dog harness. The ring attached to the chest strap this way poses a risk of getting stuck, or the risk of a human hand getting caught up. Therefore, this prior art dog harness is not suitable for everyday use.

The developments in the prior art do not provide teaching for chest harnesses with a chest strap operable by a hook-and-loop fastener. The pressure distribution element that is taught by DE202010016578 shows a solution where the loop portion attached to the chest strap of the K9-Power-harness is openable, so there is no need to fully pull the chest strap out from the fastener-slide adjuster. One of the aims set, however, the releasable connection of the chest strap to the belly strap between the two forelegs of the dog, is achieved. The device is padded. The padding portion extends beyond the chest strap towards the throat area, and in the direction of the belly strap, looped around it. The padding is looped around the belly strap by a hook-and-loop fastener stalk portion, and closed on the padding portion from the outside. A disadvantage of this prior art device is that there is no appropriate place for a ring suitable for connecting a leash. The hook-and-loop fastener connecting element attachable to the chest strap closes on only one section of the chest strap, and it does not have a portion extending in the horizontal direction to increase its adhesion surface and thus its load-bearing capacity.

Furthermore, this prior art device is not suitable for fixing a leash ring securely on the hook-and-loop fastener stalk portion, because the hook-and-loop fastener opens at even lower forces. The device is not suitable for fixing a leash ring on the padding portion either, as its use would be hindered by the stalk portion.

In the case of dog harnesses with an openable chest strap, there is no known solution in the prior art that allows the attachment of a pressure distribution element combined with a leash ring secured to the chest strap thereof in a releasable manner, where the ring is secured against displacement both horizontally and vertically, and where the ring and/or the leash carabiner are padded, and covered on the side towards the chest of the dog.

Furthermore, the prior art does not include an element containing a ring attachable to a chest strap that can be attached anywhere horizontally along almost the whole width of the hook-and-loop fasteners of the chest strap at the height of the chest bone of the dog. The prior art does not include a device comprising a chest strap connecting portion having a high load-bearing capacity and extending in the lateral direction compared to the vertical connecting element.

The connection of the chest strap of chest harnesses with an openable chest strap to the belly strap, in such a way that the connecting element is connected to both the chest strap loop section and the chest strap hook section by a hook-and-loop fastener, is not solved in the prior art. The task to be solved is to provide a secure connection with high load bearing capacity between the chest strap and the belly strap. The aim of the present invention is to eliminate the above shortcomings in the prior art.

SUMMARY OF THE INVENTION

A pressure distribution element holding a ring for chest harnesses of the present invention includes a chest strap connecting portion, and a vertical connecting element connecting the horizontal chest strap of the dog harness to the belly strap and forming a loop around the belly strap by folding back on itself. The pressure distribution element of the present invention further includes at least a loop section, continued in a lower loop portion resting on the belly strap of the dog harness, followed by a hook section, wherein the pressure distribution element is holding a ring and is attached to the horizontal chest strap of the dog harness in a releasable manner. The chest strap connecting portion of the pressure distribution element is holding a ring. The ring is comprised of two hook-and-loop fastener components fixed together back to back, a connecting portion hook component and a connecting portion loop component, with a chest strap ring attached between them. The ring attachment portion, at least on the side towards the connecting portion hook component and opposite to the chest of the dog, on the back of the connecting portion hook component, is covered by a reinforcing insert of a width equal to or greater than the width thereof, and at the ring attachment portion, from both sides thereof. The chest strap ring is fixed together with the reinforcing insert by fixing such as by sewing to limit the horizontal displacement of the chest strap ring, and the reinforcing insert included in the chest strap connecting portion is fixed together with the vertical connecting element by safety sewing. The horizontal line of the chest strap connecting portion is at a right angle to the vertical line of the vertical connecting element. The connecting portion hook component is designed to be attachable to the chest strap loop section of the horizontal chest strap of the dog harness, while the connecting portion loop component is designed to be attachable to the chest strap hook section in such a way that the chest strap connecting portion is covered at least partially by the chest strap hook section on the side towards the chest of the dog.

An advantage of the present invention is to provide a secure connection with high load bearing capacity between the chest strap and the belly strap, and to develop a chest strap connecting portion for this purpose in such a way that the chest strap connecting portion is attached to the chest strap of the dog harness by means of hook-and-loop fasteners along such a width that allows it to withstand a load equal to the weight of the dog without opening. The chest strap connecting portion should be wider compared to the vertical connecting element.

The advantage of the present invention is to develop a pressure distribution element for dog harnesses with a chest strap openable by a hook-and-loop fastener that can be easily removed from the dog harness after work and is suitable at the same time for attaching a ring to allow the training and leading of the dog on a leash. The present invention protects the chest of the dog from coming into direct contact with the carabiner or the ring by padding, and can be positioned anywhere along the whole width of the chest. The ring attached to the chest strap is easily accessible from all directions for the trainer controlling the leash. It has, in addition to the ring attachment portion, a possibly curved and large surface for the connection of a leash. The chest strap ring is relieved from any other force not resulting from the use of a leash connected to the chest strap ring. During use, a chest strap ring of the prior art poses a risk of getting stuck, that is, a risk of accident, and therefore, its removability in the present invention is important. The problem solved by the present invention is to connect the chest strap ring to the belly strap. The connection disclosed in the present invention, in order to distribute the pressure on the chest, covers the largest possible surface on the chest of the dog.

The pressure distribution element holding a ring of the present invention can contain a "V" portion between the chest strap connecting portion and the vertical connecting element in order to optimize pressure distribution on the chest of the dog. Thus, the present invention teaches a pressure distribution element holding a ring that is attachable to the horizontal chest strap of a chest harness closable-openable by a hook-and-loop fastener, by connecting the chest strap loop section and the chest strap hook section, comprising a chest strap connecting portion with a vertical connecting element connecting the horizontal chest strap of the dog harness to the belly strap, forming a loop around the belly strap by folding back on itself, comprising at least a loop section, continued in a lower loop portion resting on the belly strap of the dog harness, and followed by a hook section.

The essence of the present invention is that the pressure distribution element holding a ring is attached to the horizontal chest strap and the belly strap in a releasable manner. That is, the chest strap connecting portion of the pressure distribution element holding a ring is comprised of two hook-and-loop fastener components fixed together back to back, a connecting portion hook component and a connecting portion loop component, with a chest strap ring attached between them, the ring attachment portion of which, at least on the side towards the connecting portion hook component, opposite to the chest of the dog, on the back of the connecting portion hook component, is covered by a reinforcing insert of a width equal to or greater than the width thereof. At the ring attachment portion, from both sides thereof, the chest strap ring is fixed together with the reinforcing insert by sewing, limiting the horizontal displacement of the chest strap ring. The reinforcing insert included in the chest strap connecting portion is fixed together with the vertical connecting element by safety sewing. The horizontal line of the chest strap connecting portion is at a right angle to the vertical line of the vertical connecting element. The connecting portion hook component is designed to be attachable to the chest strap loop section of the horizontal chest strap of the dog harness, while the connecting portion loop component is designed to be attachable to the chest strap hook section in such a way that the chest strap connecting portion is covered at least partially by the chest strap hook section on the side towards the chest of the dog.

The vertical connecting element is connected to the chest strap connecting portion most preferably on both sides of the chest strap ring, by forming a "V" shaped chest portion. The width of the chest strap connecting portion is most preferably equal to or greater then the combined width of the loop section and the hook section. The reinforcing insert is most preferably a strap-shaped fabric. The ring is most preferably D-shaped and the straight section is the ring attachment portion. The ring is most preferably a welded metal ring.

BRIEF DESCRIPTION OF THE DRAWINGS

Other advantages of the present invention will be readily appreciated as the same becomes better understood by reference to the following detailed description when considered in connection with the accompanying drawings, wherein.

DETAILED DESCRIPTION OF THE INVENTION

Figure 1:
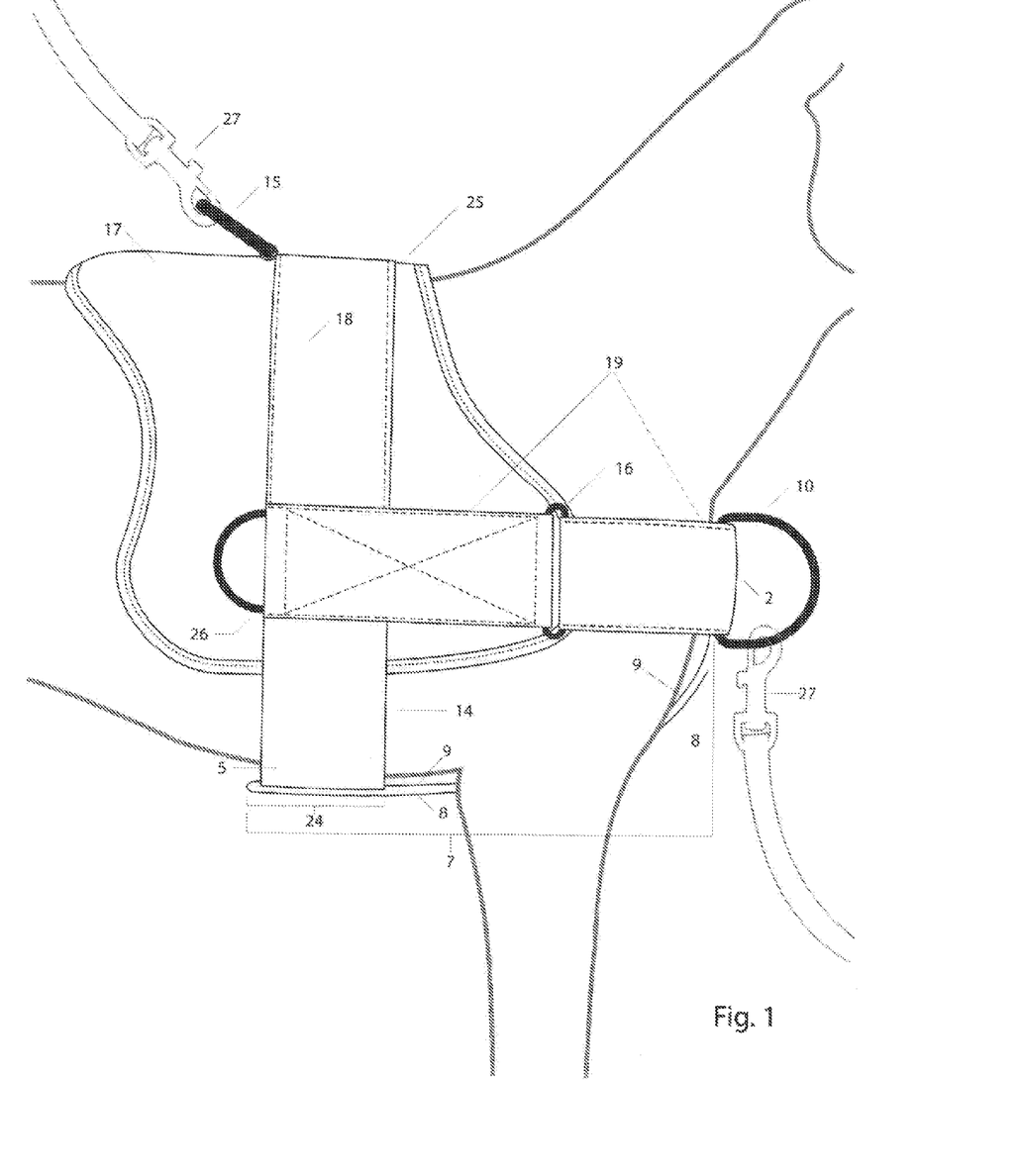
FIG. 1 shows a side view of a chest harness on a dog, equipped with a side ring and a chest strap ring.

FIG. 1 shows a side view of a dog harness 25 preferably comprising a saddle part 17, having a horizontal chest strap 2 connected at least on one side of the dog harness 25 to a loop adjuster 16, which loop adjuster 16 interrupts the continuity of the horizontal chest strap 2 and is preferably attached to the saddle part 17 on one side of the dog harness 25, in the line of the forelegs of the dog. The horizontal chest strap 2 is connected to the back strap 18 and the belly strap 5, and a side ring 26 suitable for connecting a leash is attached to it, covered at least partially by the back strap 18. The horizontal chest strap 2 is fixed to the saddle part 17 over a given section by chest strap sewing 19 running along the whole length of the chest strap 2. Most preferably, the side ring 26 is partially covered by that part of the horizontal chest strap 2 fixed to the saddle part 17, and is fixed to the horizontal chest strap 2 and the saddle part 17 by chest strap sewing 19.

A chest strap ring 10 is attached to the horizontal chest strap 2 in a releasable manner, and there is a vertical connecting element 7 in the direction of the belly strap 5, connecting the chest strap ring 10 to the belly strap 5 in a releasable manner. The vertical connecting element 7 comprises a lower loop portion 24 looped around the belly strap 5. The lower loop portion 24 of the vertical connecting element 7 is formed in a continued manner between the loop section 9 and hook section 8.

There are at least two rings, a side ring 26 and a chest strap ring 10 attached simultaneously to the chest strap 2 of the dog harness 25, and a leash ring 15 attached to the back strap 18, which are suitable for connecting a leash 27.

Figure 2:
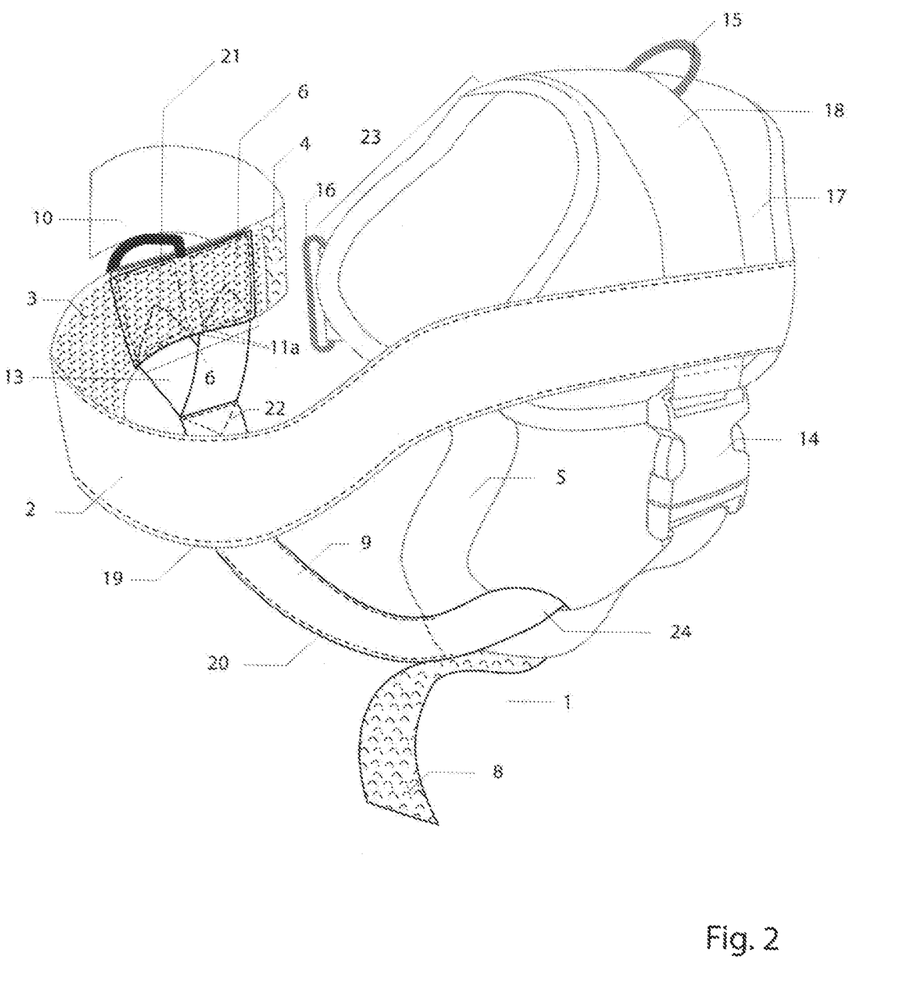
FIG. 2 shows a side-front view of the chest harness with the horizontal chest strap in an open state, and a pressure distribution element holding a ring attached to the chest strap loop section.

FIG. 2 shows a side-front view of a chest harness 25 with the horizontal chest strap 2 in a fully open state, and the chest strap connecting portion 6 of the pressure distribution element holding a ring 1 attached, by the side opposite to the chest of the dog, to the chest strap loop section 3 fixed by chest strap sewing 19. The chest strap ring 10 is padded by the chest strap connecting portion 6 on the side towards the chest of the dog. The connection of the chest strap connecting portion 6 to the horizontal chest strap 2 in the direction of the loop adjuster 16 is limited by the chest strap hook section 4, as the side of the chest strap connecting portion 6 opposite to the chest of the dog can be connected only to the chest strap loop section 3 of the horizontal chest strap 2.

The chest strap connecting portion 6 of the pressure distribution element holding a ring 1 is most preferably secured by diagonal safety sewing 21. The chest strap connecting portion 6 is the widest part of the pressure distribution element holding a ring 1 in the horizontal direction. In a preferred embodiment, the width of the chest strap connecting portion 6 is equal to or greater than the combined width of the loop section 9 and the hook section 8. In a preferred embodiment, the chest strap connecting portion 6 is continued in a chest portion 13, extending beyond the horizontal chest strap 2 in the direction of the belly strap 5, that is, in the vertical direction, covering the chest bone of the dog. In a preferred embodiment, the chest portion 13 is fixed on both sides of the chest strap ring 10 to the chest strap connecting portion 6 by safety sewing 21, which can be zig-zag or back-and-forth sewing, but most preferably is diagonal sewing. The chest portion 13 is continued in a loop section 9, and it is connected to the loop section 9 by chest portion safety sewing 22. The chest portion safety sewing 22 can be zig-zag or back-and-forth sewing, or diagonal sewing. The loop section 9 is fixed by vertical connecting element sewing 20, then continued in a lower loop portion 24 looped around the belly strap 5. FIG. 2 shows the hook section 8 in a state before closing on the loop section 9.

The chest strap hook section 4 of the horizontal chest strap 2 of the dog harness 25 is threaded through a loop adjuster 16. In a preferred embodiment, on one side of the dog harness 25, the horizontal chest strap 2 is connected in a continued manner to a back strap 18, back strap 18 ending in a buckle 14. On the other side of the dog harness 25, a loop adjuster 16 interrupts the continuity of the horizontal chest strap 2. On both sides of the dog harness 25, the horizontal chest strap 2 is connected to the back strap 18 in the direction of the leash ring 15 by a connecting element 23 formed from a section of the saddle part 17, or formed by a strap.

Figure 3:
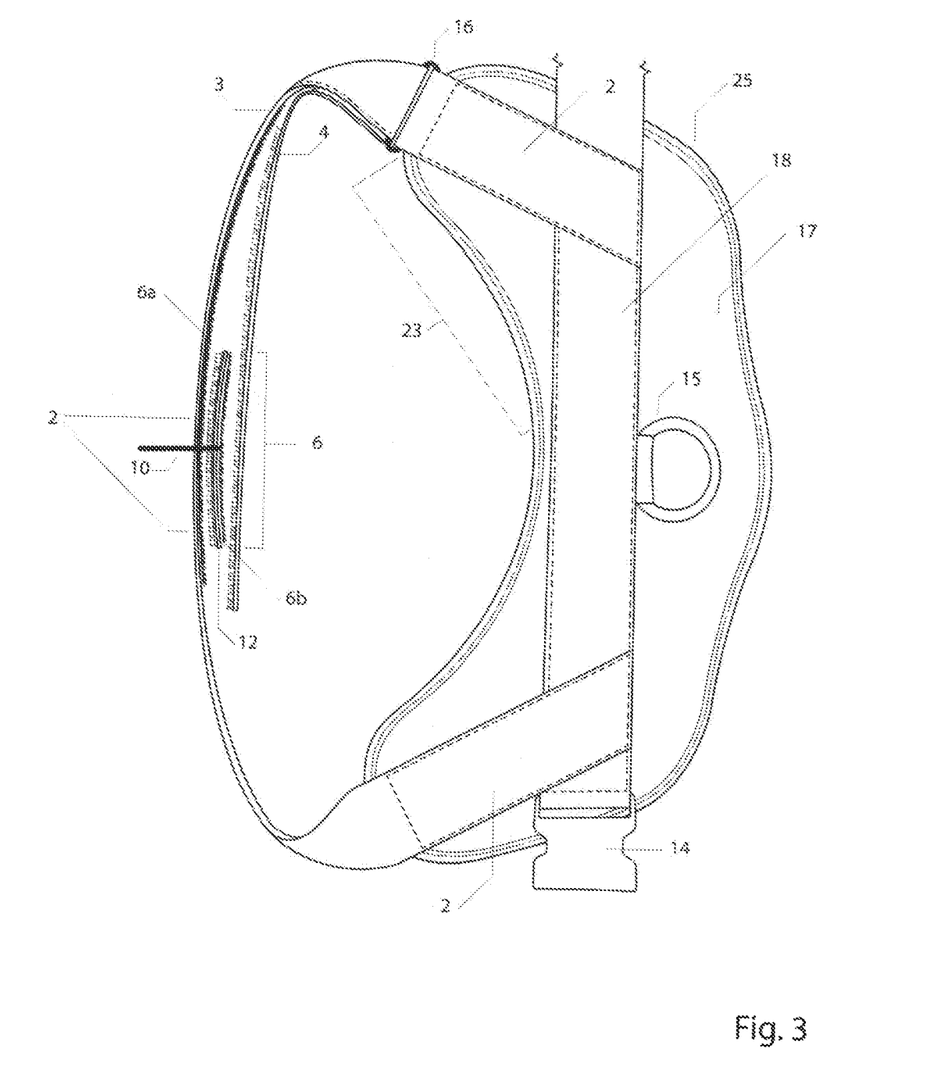
FIG. 3 shows a top view of a dog harness in a spread-out state, showing the chest strap connecting portion on the chest strap in a state before connection.

FIG. 3 shows a dog harness 25 in a spread-out state, with its straps carried by and padded by a saddle part 17. Saddle part 17 has a back strap 18 ending in a buckle 14, back strap 18 having a leash ring 15 attached. The saddle part 17 performing a padding function forms a connecting element 23 between the horizontal chest strap 2 and the back strap 18 on both sides of the dog harness 25. At one end, the horizontal chest strap 2 is connected to the saddle part 17 in a fixed and continued manner, while at the other end it is interrupted by a loop adjuster 16, and is threaded through it. FIG. 3 shows the chest strap connecting portion 6 in a state before connection to the horizontal chest strap 2. The chest strap ring 10 extends beyond the horizontal chest strap 2 in the direction opposite to the chest of the dog, providing the largest possible surface for the connection of a leash. The chest strap hook section 4 is connected to the connecting portion loop component 6b and provides padding on the side towards the chest of the dog. The chest strap loop section 3 is connected to the connecting portion hook component 6a.

The chest strap connecting portion 6 extends in the horizontal direction on both sides of the chest strap ring 10, most preferably extending from the chest strap ring 10 to a distance equal to at least the height of the chest strap ring 10. The connecting portion hook component 6a is separated from the chest strap ring 10 by a reinforcing insert 12. The reinforcing insert 12 prevents the connecting portion hook component 6a from being torn out even in the case of higher loads, and therefore, the width of the reinforcing insert 12 is preferably equal to or greater than that of the connecting portion hook component 6a.

Figure 4:
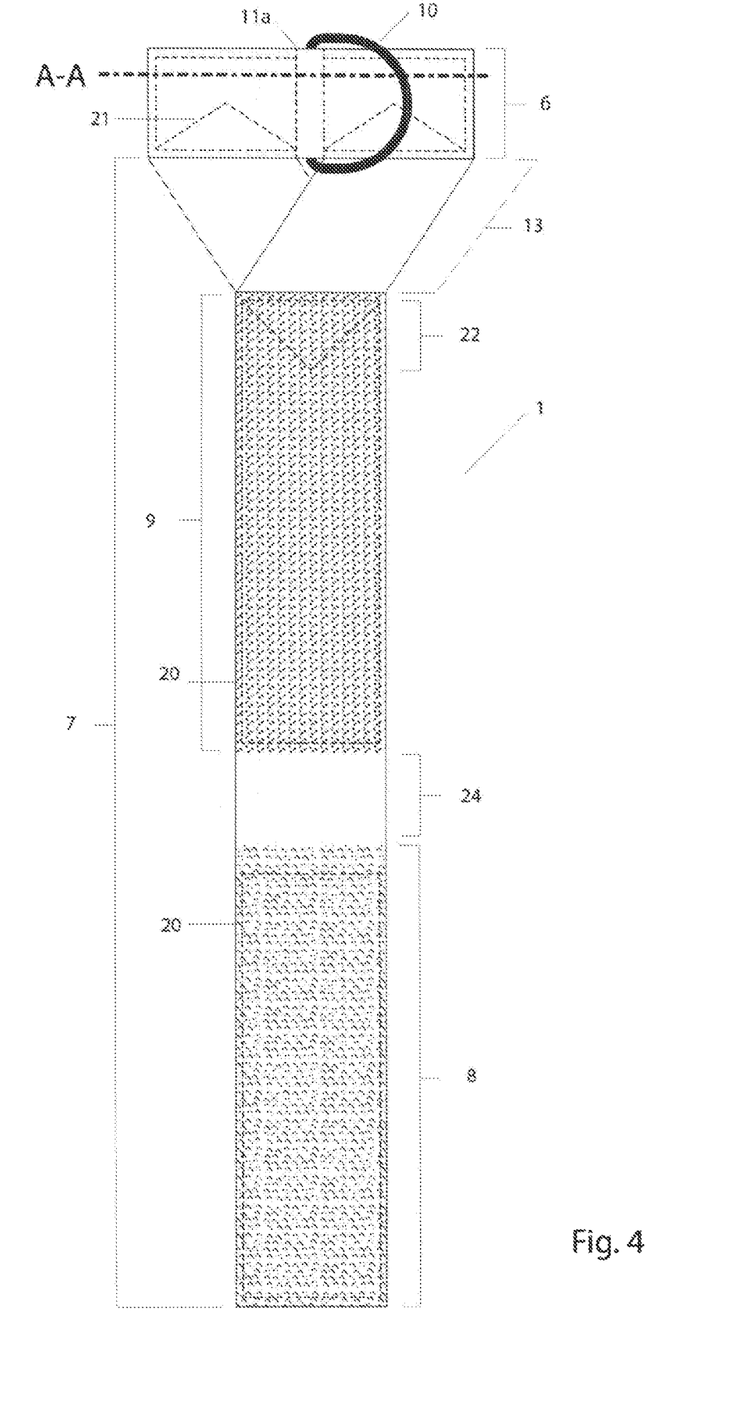
FIG. 4 shows the straps and hook-and-loop fasteners of the pressure distribution element holding a ring in an open, spread-out state.
Figure 5:
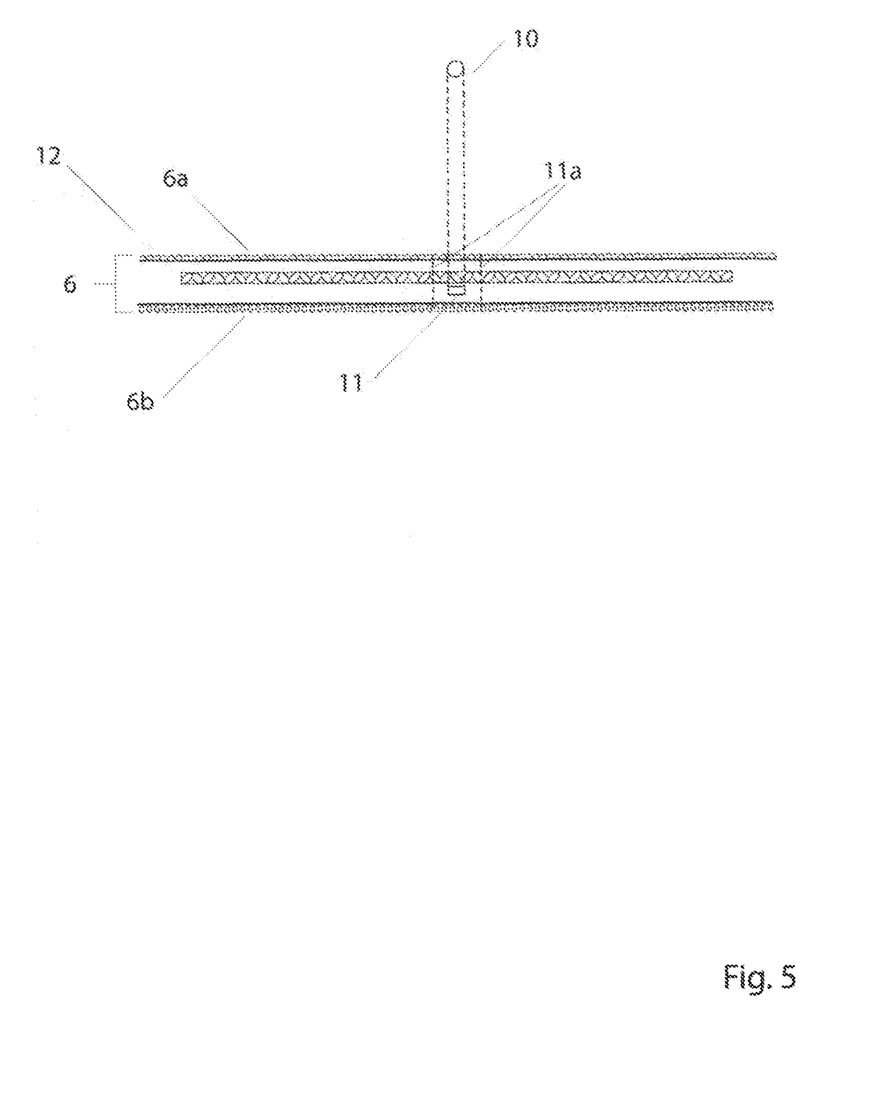
FIG. 5 shows a detailed view of the A-A cross-section indicated in FIG. 3, showing the order of the layers of the chest strap connecting portion and the horizontal chest strap, and the ring attachment portion.

FIG. 4 shows a front view of the pressure distribution element holding a ring 1 in a spread-out state. The pressure distribution element holding a ring 1 consists of two main parts, a chest strap connecting portion 6 and a vertical connecting element 7. The vertical connecting element 7 is fixed to the chest strap connecting portion 6 by safety sewing 21. The chest strap connecting portion 6 closes the vertical connecting element 7 in a "T" shape. The chest strap connecting portion 6 is wider than the loop section 9 of the vertical connecting element 7. The width of the chest strap connecting portion 6 is most preferably equal to or greater than the combined width of the loop section 9 and the hook section 8. The loop section 9 of the vertical connecting element 7 is continued in a lower loop portion 24 ending in the hook section 8. The loop section 9 and the hook section 8 are fixed by vertical connecting element sewing 20. In a preferred embodiment, the vertical connecting element 7 widens into a chest portion 13 that provides padding to the chest of the dog between the chest strap connecting portion 6 and the loop section 9. The chest portion 13 is fixed by heavy-duty safety sewing 21 on both sides of the chest strap ring 10, forming a "V" shape. FIG. 5 shows a cross-sectional view of the chest strap connecting portion 6 along the lines A-A in FIG. 4.

According to FIG. 5, the connecting portion hook component 6a is fixed to a reinforcing insert 12, preferably a fabric strap and/or a strap of other material. The ring attachment portion 11 of the chest strap ring 10 is covered on one side by at least the reinforcing insert 12, while on the other side, towards the chest of the dog, ring attachment portion 11 is covered by the connecting portion loop component 6b.

The pressure distributor holding a ring offers a solution to increase the versatility of dog harnesses with a chest strap openable by a hook-and-loop fastener. Attachment of a heavy-duty chest strap ring to the chest strap in a releasable manner facilitates the training of dogs, allowing them to be easily led aside, away from conflict situations. Removal of the chest strap ring after work for the dog has ended allows the use of the dog harness for everyday purposes.

The chest strap connecting portion or the chest strap ring does not come into direct contact with the fur of the dog, and thus, it is not felt by or irritating for the dog. Vertical connection to the belly strap excludes the possibility of the chest strap of the dog harness sliding towards the neck of the dog and causing pain or stress.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A pressure distribution element holding a ring for a chest harness and attachable to a horizontal chest strap of the chest harness which is closed and opened by a hook-and-loop fastener, by connecting the chest strap loop section and the chest strap hook section, a said pressure distribution element holding the ring comprising a chest strap connecting portion, and a vertical connecting element connecting the horizontal chest strap of the chest harness to the belly strap, forming a loop around said belly strap by folding back on itself, including at least a loop section, continued in a lower loop portion resting on said belly strap of the chest harness, and followed by a hook section, wherein said pressure distribution element holding the ring is attached to the horizontal chest strap of the chest harness in a releasable manner, wherein said chest strap connecting portion of said pressure distribution element holding the ring includes two hook-and-loop fastener components fixed together back to back, a connecting portion hook component and a connecting portion loop component, with a chest strap ring attached therebetween, a ring attachment portion of which, at least on the side towards said connecting portion hook component, opposite to the chest of the dog, on the back of said connecting portion hook component, is covered by a reinforcing insert.

2. The pressure distribution element holding a ring as set forth in claim 1, wherein the width of said reinforcing insert is equal to or greater than the width of said connecting portion hook component.

3. The pressure distribution element holding the ring as set forth in claim 2, wherein, at said ring attachment portion, from both sides thereof, said chest strap ring is fixed together with said reinforcing insert by fixing sewing, limiting the horizontal displacement of said chest strap ring.

4. The pressure distribution element holding the ring as set forth in claim 3, wherein said reinforcing insert included in said chest strap connecting portion is fixed together with said vertical connecting element by safety sewing, and the horizontal line of said chest strap connecting portion is at a right angle to the vertical line of said vertical connecting element.

5. The pressure distribution element holding the ring as set forth in claim 4, wherein said vertical connecting element is connected to said chest strap connecting portion on both sides of said chest strap ring, by forming a "V" shaped chest portion.

6. The pressure distribution element holding the ring as set forth in claim 4, wherein the width of said chest strap connecting portion is equal to or greater than the combined width of said loop section and said hook section.

7. The pressure distribution element holding the ring as set forth in claim 2, wherein said reinforcing insert included in said chest strap connecting portion is fixed together with said vertical connecting element by safety sewing, and the horizontal line of said chest strap connecting portion is at a right angle to the vertical line of said vertical connecting element.

8. The pressure distribution element holding the ring as set forth in claim 7, wherein said vertical connecting element is connected to said chest strap connecting portion on both sides of said chest strap ring, by forming a "V" shaped chest portion.

9. The pressure distribution element holding the ring as set forth in claim 7, wherein the width of said chest strap connecting portion is equal to or greater than the combined width of said loop section and said hook section.

10. The pressure distribution element holding the ring as set forth in claim 1, wherein, at said ring attachment portion, from both sides thereof, said chest strap ring is fixed together with said reinforcing insert by fixing sewing, limiting the horizontal displacement of said chest strap ring.

11. The pressure distribution element holding the ring as set forth in claim 10, wherein said reinforcing insert included in said chest strap connecting portion is fixed together with said vertical connecting element by safety sewing, and the horizontal line of said chest strap connecting portion is at a right angle to the vertical line of said vertical connecting element.

12. The pressure distribution element holding the ring as set forth in claim 11, wherein said vertical connecting element is connected to said chest strap connecting portion on both sides of said chest strap ring, by forming a "V" shaped chest portion.

13. The pressure distribution element holding the ring as set forth in claim 11, wherein the width of said chest strap connecting portion is equal to or greater than the combined width of said loop section and said hook section.

14. The pressure distribution element holding the ring as set forth in claim 1, wherein said reinforcing insert included in said chest strap connecting portion is fixed together with said vertical connecting element by safety sewing, and the horizontal line of said chest strap connecting portion is at a right angle to the vertical line of said vertical connecting element.

15. The pressure distribution element holding the ring as set forth in claim 1, wherein said connecting portion hook component is designed to be attachable to said chest strap loop section of the horizontal chest strap of the chest harness, while said connecting portion loop component (6b) to said chest strap hook section (4) in such a way that said chest strap connecting portion (6) is covered at least partially by said chest strap hook section (4) on the side towards the chest of the dog.

16. The pressure distribution element holding the ring as set forth in claim 1, wherein said vertical connecting element is connected to said chest strap connecting portion on both sides of said chest strap ring, by forming a "V" shaped chest portion.

17. The pressure distribution element holding the ring as set forth in claim 1, wherein the width of said chest strap connecting portion is equal to or greater than the combined width of said loop section and said hook section.

18. The pressure distribution element holding the ring as set forth in claim 1, wherein said reinforcing insert is a strap-shaped fabric.

19. The pressure distribution element holding the ring as set forth in claim 1, wherein said chest strap ring is a D-shape configuration and the straight section is said ring attachment portion.

20. The pressure distribution element holding the ring as set forth in claim 1, wherein said chest strap ring is a welded metal ring.

\* \* \* \* \*